United States Patent [19]

Kato et al.

[11] 4,306,290

[45] Dec. 15, 1981

[54] IMAGE GRADATION PROCESSING METHOD AND APPARATUS FOR RADIOGRAPHIC IMAGE COPYING SYSTEM

[75] Inventors: Hisatoyo Kato; Masamitsu Ishida; Seiji Matsumoto, all of Minami-ashigara, Japan

[73] Assignee: Fuji Photo Film Co. Ltd., Kanagawa, Japan

[21] Appl. No.: 106,849

[22] Filed: Dec. 26, 1979

[30] Foreign Application Priority Data

Dec. 26, 1978 [JP] Japan ................... 53-163574

[51] Int. Cl.³ ........................... G01T 1/20
[52] U.S. Cl. ...................... 364/414; 250/363 R; 358/166
[58] Field of Search ............... 364/414, 515, 518; 358/96, 111, 166; 250/445 T, 445 R, 362, 363 R

[56] References Cited

U.S. PATENT DOCUMENTS

| | | | |
|---|---|---|---|
| 3,006,238 | 10/1961 | Eberline | 358/96 |
| 3,696,249 | 10/1972 | Bowker | 358/96 |
| 3,936,598 | 2/1976 | Newitt | 358/96 |

FOREIGN PATENT DOCUMENTS 2440867 8/1975 Fed. Rep. of Germany ........ 358/96

OTHER PUBLICATIONS

Sutton et al., "Texture Measures for Automatic Classification of Pulmonary Disease", IEEE Trans. on Computers, vol. 6–21, No. 7, Jul. 1972.

*Primary Examiner*—Errol A. Krass
*Attorney, Agent, or Firm*—Gerald J. Ferguson, Jr.; Joseph J. Baker

[57] ABSTRACT

A method and apparatus for processing a frontal chest radiograph in a radiographic image copying system in which an original radiograph is scanned with a scanning light beam and the light transmitted through the radiograph is detected by a photodetector which gives an output to be processed and used for recording a visible image on a recording medium. The frontal chest radiograph is gradation processed. The gradation processing is characterized in that the density at the boundary of the heart and the lungs of the image on the recording medium is lowered to lower the contrast of the heart and raise the contrast of the lungs.

5 Claims, 12 Drawing Figures

FIG. 9
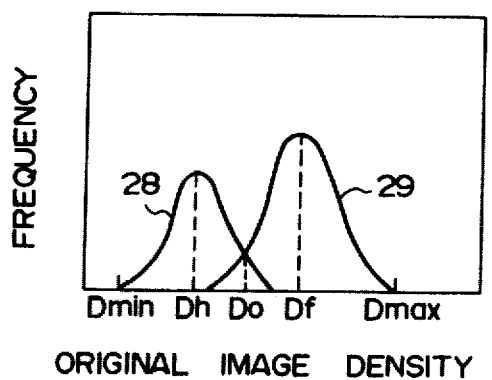
FIG. 10A
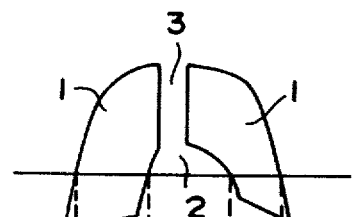
FIG. 10B
FIG. 10C
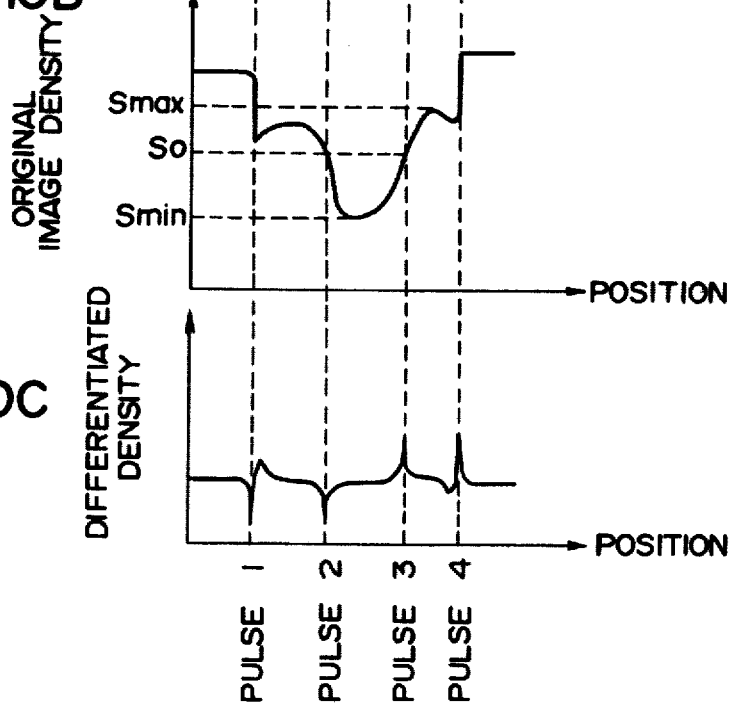

IMAGE GRADATION PROCESSING METHOD AND APPARATUS FOR RADIOGRAPHIC IMAGE COPYING SYSTEM

BACKGROUND OF THE INVENTION

1. Field of the Invention

This invention relates to a method of processing a radiographic image in a radiographic image copying system used for medical diagnosis and apparatus therefor. This invention particularly relates to an image gradation processing method and apparatus in a radiographic image copying system in which an original frontal chest radiograph is read out and recorded on a recording medium.

2. Description of the Prior Art

In the chest radiography, an X-ray film is used for recording the X-ray transmission image of radiography is observed with the naked eyes for diagnosis. In the chest radiography, there are recorded lungs, a heart and a spine. The spine has the lowest density since the transmittance thereof to the X-rays is low. The heart has the second lowest density since the transmittance thereof to the X-rays is comparatively low. The lungs has high density since the transmittance thereof to the X-rays is high. Further, since the lungs have complex trachea bronchus and blood vessels, the image of the lungs is very complicated. The part outside the substantial image of the human body has the upmost density since this part of the X-ray film is exposed to X-rays directly coming from the X-ray source.

As mentioned above, the chest radiography has various information of various parts of the human body which is recorded in the density having a wide range of levels. Sometimes, the density ranges from 0 to 3.5 in terms of optical density. Further, since the various parts are not recorded in the desirable contrast respectively, it is very difficult and necessary to have a great skill to make proper diagnosis from the radiograph in which the disease must be found out from a very slight variation in density in the image.

It is generally known in the art that the image properties can be changed by processing the image by use of an electronic signal or information processing method. For instance, even in radiography, it is possible to read the image recorded on the X-ray film by an optical scanning means and process the read out signal by a signal processing means to change the various image properties such as contrast and the density level and then record a visible image on a recording film or the like based on the processed signal.

In the radiography, however, the recorded image is used for the purpose of "diagnosis" and the diagnostic efficiency and accuracy (the level of easiness for diagnosis or adaptability to diagnosis) are not simply enhanced by simply making so-called "good" image from the point of the ordinary image quality factors such as sharpness, granularity and contrast. Rather than these factors, the diagnosis efficiency and accuracy are influenced by other complex factors such as reference with the normal pattern, reference with the anatomical structure and utilization of other diagnostic view or records.

On the other hand, it has been known in the art as one example of image processing to record the radiograph on a microfilm in a reduced size. For instance, as shown in Japanese Patent Laid Open No. 48(1973)-25523, it is known to use a photographic film having a modified gradient contrast in which the contrast (gamma) is lowered in the high density area to compress the density range at the time of copying, and further conduct an unsharp masking process to compensate the lowering of sharpness caused by image size reduction and copying. This process, however, is effective only for preventing the lowering of the image quality in the image size reduction and copying steps and is not made for the purpose of enhancing the diagnostic efficiency and accuracy.

SUMMARY OF THE INVENTION

The primary object of the present invention is to provide a method of and apparatus for gradation processing of the chest radiograph.

Another object of the present invention is to provide a method of and apparatus for processing a radiographic image in a radiographic image copying system which is capable of obtaining a radiographic image having high diagnostic efficiency and accuracy.

The method of and apparatus for gradation processing the radiographic image of the chest of this invention are characterized in that the density at the boundary of the heart and the lungs of the image on the recording material is lowered to lower the contrast of the heart and thereby raising the contrast of the lungs in the radiographic image finally recorded on a recording medium.

In accordance with the gradation process as mentioned above, the density range of the heart becomes narrow and the lower density of lungs is more lowered and the contrast of the lungs is enhanced, and consequently the image thus gradation processed is improved of its diagnostic efficiency and accuracy. It should be noted that, though the contrast of the heart is lowered, it does not affect the diagnostic efficiency and accuracy since this part is the brightest part and human eyes have high gradational response to such a part. Since the spine has substantially the same density as the heart, this part does not affect the diagnostic efficiency and accuracy either.

In general, most of the chest radiographs are made for the purpose of mainly observing the lungs. Therefore, in accordance with the present invention in which the contrast and the density of the lungs are particularly improved, the diagnostic efficiency and accuracy of the lungs are markedly enhanced without substantially lowering the diagnostic efficiency and accuracy of the spine and the heart.

BRIEF DESCRIPTION OF THE DRAWINGS

FIGS. 8 and 9 are histograms of the densities respectively of the heart and the lungs, and FIGS. 10A to 10C show the density measured and the differential waveform obtained when the central part of the heart is horizontally scanned.

DESCRIPTION OF PREFERRED EMBODIMENTS

Now the present invention will be described in detail with reference to the drawings.

Figure 1:
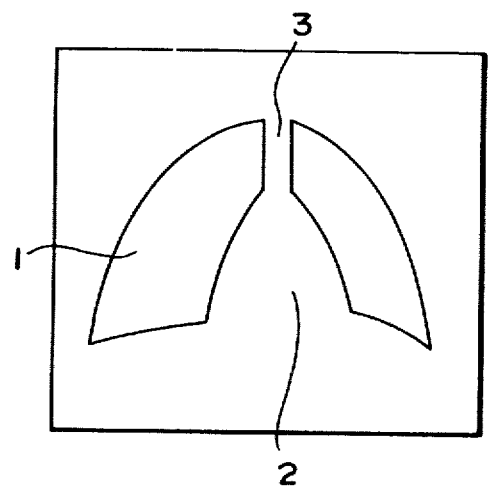
FIG. 1 is a schematic view of a chest radiograph to be processed in accordance with the present invention.

Referring to FIG. 1, a frontal chest radiograph has images of lungs 1, heart 2, and spine 3. Since the conventional chest radiograph does not have desirable density and contrast, the accurate diagnosis is not easy from the radiograph as it is. In accordance with the present invention, therefore, the X-ray image information is read out from the image of the original radiograph (hereinafter referred to as "original image") and the read out information is processed by a signal conversion system for varying the gradation when the image is finally recorded on a recording medium like a photographic film.

Among the densities of the original image, the density of the lungs 1 has the highest level excluding the area outside the object, that is, human body, and the densities of the spine 3 and the heart 2 have the lowest level. The difference between the density of the spine 3 and the density of the heart 2, the latter being a little higher than the former, is very samll and accordingly both densities can be represented by one of the signals practically. These densities will hereinbelow be represented by the density of the heart 2. Therefore, by obtaining the minimum value Dmin of the density of the spine and the heart and the maximum value Dmax of the density of the lungs and performing the density conversion only on the densities having a level between these values, it is possible to conduct the gradation processing on the necessary image to obtain a radiographic image having high diagnostic efficiency and accuracy.

In the present invention, the density at the boundary of the lungs 1 and the heart 2 is lowered to lower the contrast of the heart 2 and raise the contrast of the lungs 1. By lowering the density at the boundary of the lungs 1 and the heart 2, the diagnostic efficiency and accuracy are enhanced.

Figure 2:
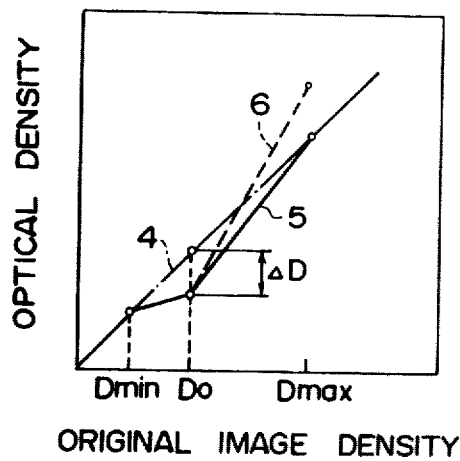
FIG. 2 is a graph showing an embodiment of the gradation processing in accordance with the present invention.

FIG. 2 is a graph showing the gradation processing, in which the chain line 4 represents a linear signal conversion shown by a straight line extending between the maximum density point at the maximum value of the original density Dmax and the minimum density point at the minimum value of the original density Dmin. It should be noted that processing shown by the line 4 means no processing. That is, processed image has the same gradation as the original image.

It should be understood here that the photographic film used for recording the final radiographic image does not usually have such a linear characteristics, and accordingly, in order to effect such a linear signal conversion on the photographic film it is necessary to perform a well known "gamma correction". Therefore, it should be noted that the gamma correction should be performed together with the gradation processing. In the description hereinbelow, the description will be made only with respect to the gradation processing on the assumption that the signals are to be subjected, if necessary, to the gamma correction.

Referring now back to FIG. 2, the solid line 5 shows an example of the signal processing conducted in accordance with the present invention. The signal level corresponding to the density at the boundary between the lungs 1 and the heart 2 is indicated with the reference character Do and the lowered density from the original level at the boundary level Do is indicated with $\Delta D$. In the embodiment as shown in FIG. 2, the degree of lowering the density is made maximum at the boundary level Do. Therefore, the contrast between the heart 3 and the spine 2 within the density range between Dmin and Do is lowered, and the contrast of the lungs 1 within the density range between Do and Dmax is raised as shown by the gradient of the curve 5 in FIG. 3

Further, when the maximum density Dmax of the lungs 1 is not so high, for instance 1, 5 or less, the density may be converted so that maximum density on the final radiographic image on the film may become higher than that of the original radiograph to further raise the contrast in the lung 1. The broken line 6 in FIG. 2 shows an example of such a gradation processing.

The minimum density Dmin at the heart 2 and the spine 3 is often at the same level as the fog density of the film. In such a case, it is often preferred to raise the minimum density Dmin by 0.01 to 0.1.

The preferred degree of lowering of the density at the boundary level Do depends upon the observer who conducts the diagnosis based on the radiographic image recorded on the film and also upon the characteristics of the radiograph itself such as the difference in density between the heart and the lungs. In general, when the degree of lowering of the density $\Delta D$ is small, the gradation change is small, and, therefore, improvement of diagnostic efficiency and accuracy is too small. When $\Delta D$ is too large, the contrast of the heart is too much lowered and the diagnostic efficiency and accuracy in the heart are lowered. As the result of tests, it was proved that the diagnostic efficiency and accuracy were improved when $\Delta D$ was within the range of 0.1 to 0.5.

Figure 3:
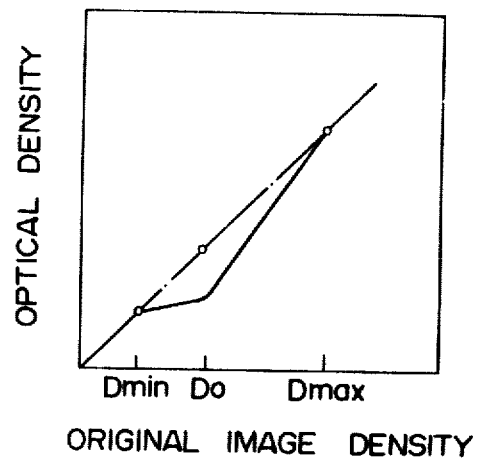
FIGS. 3 and 4 are graphs showing other embodiments of the gradation processing in accordance with the present invention.
Figure 4:
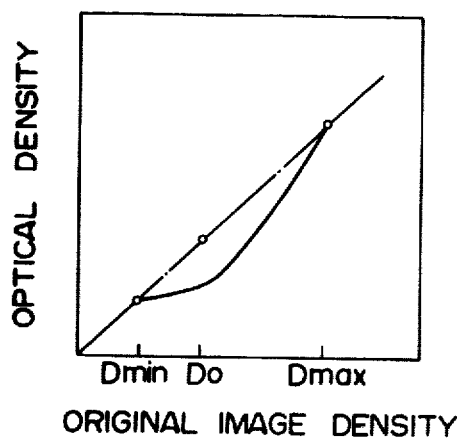

In the embodiment shown in FIG. 2, since the gradation variation is made discontinuous at the boundary level Do. Therefore, the variation in density is also made discontinuous at the boundary and the image appears unnatural because of the discontinuity. Accordingly, it is desirable that the variation of the density be made continuous or smooth at the boundary level Do as shown in FIGS. 3 and 4. In FIG. 3, the angled point at the boundary level Do is rounded. In FIG. 4, the whole curve is changed continuously. With these embodiments as shown in FIGS. 3 and 4, the gradation variation is made smooth and natural.

The results were evaluated by four radiologists since it was impossible to evaluate the diagnostic efficiency and accuracy by the objective physical evaluation by use of sharpness, contrast and granularity.

The standard evaluation was as follows.

+2: The diagnostic efficiency and accuracy were greatly enhanced and improved. For instance, the diseased portions which were hardly recognized in the original radiograph have become clearly recognizable.

+1: The diagnostic efficiency and accuracy were improved. For instance, the diseased portions which were difficult to recognize have become recognizable.

0: The diagnostic efficiency and accuracy were not so improved, though the image has become somewhat clearer.

−1: The diagnostic efficiency and accuracy were lowered in some parts even though they were somewhat improved in other parts.

−2: The diagnostic efficiency and accuracy were lowered with no parts where they were improved.

Figure 5:
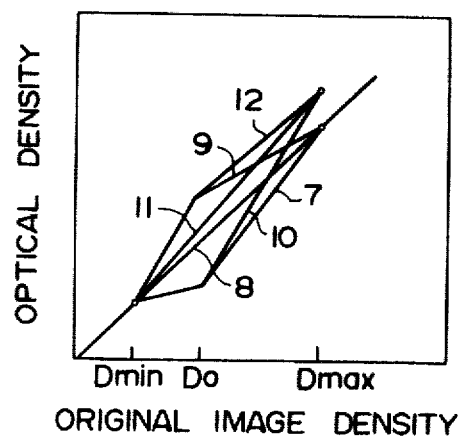

Under the above standard, original images of ten samples of chest radiograph including the normal pattern, cancer pattern, pneumonia pattern and so forth which were subjected to the gradation processing of various types as shown in FIG. 5 were presented to four radiologists and the diagnostic efficiency and accuracy were evaluated for these samples. In FIG. 5, the curves 7 and 10 are examples of the gradation processing in which the density at the boundary between the heart and the lungs were lowered by 0.3. The curve 8 represents variation without any gradation processing, and curve 9, 11 and 12 show example of the gradation processing not based on the present invention.

The results of the evaluation are shown in Table 1.

TABLE 1

| Gradation Processing | Evaluation (average value) | General Evaluation |
|---|---|---|
| Curve 7 | +1.5 | Improved |
| Curve 8 | +0.1 | No change |
| Curve 9 | −2.0 | Degraded |
| Curve 10 | +1.9 | Improved |
| Curve 11 | −0.5 | No change or Slightly degraded |
| Curve 12 | −1.2 | Degraded |

Then, in order to find out the effective range of the degree of density lowering $\Delta D$ at the boundary level Do, ten samples were eveluated by four radiologists.

Figure 6:
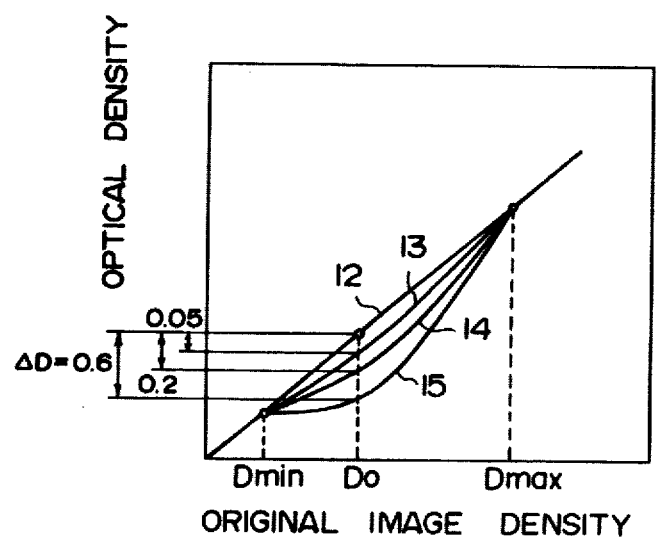
FIGS. 5 and 6 show various embodiments of the gradation processing in accordance with the present invention and some examples of the gradation processing which are not included in the present invention.

The gradation processes conducted are shown in FIG. 6. The degree of density lowering $\Delta D$ was made 0.05, 0.2 and 0.6 in the examples shown by curves 13, 14 and 15. The curve 12 shows an example without any gradation processing.

The results of the evaluation are shown in Table 2.

TABLE 2

| Gradation Processing | Evaluation (average value) | General Evaluation |
|---|---|---|
| Curve 12 | +0.1 | No change |
| Curve 13 | +0.3 | No particular change |
| Curve 14 | +1.6 | Improved |
| Curve 15 | −2.0 | Degraded, Heart disappeared |

According to the tests conducted by the present inventors, the degree of lowering $\Delta D$ of the density at the boundary level Do was within the range of 0.1 to 0.5 in order to effectively enhance the diagnostic efficiency and accuracy.

Figure 7:
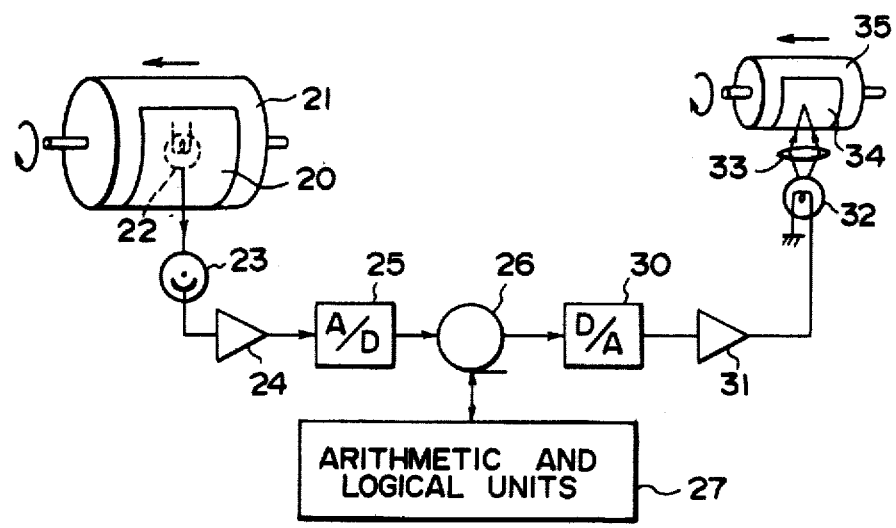
FIG. 7 is a block diagram of a radiographic image copying system in which the image processing apparatus of the present invention is employed.

FIG. 7 is a block diagram showing the outline of the radiographic image copying system in which the method and apparatus of this invention are embodied. An original radiograph 20 on which a chest image is recorded is mounted on a drum transparent 21. The drum transparent 21 is moved in the axial direction as well as rotated about its axis so that the radiograph 20 is exposed to a light beam from a read-out light source 22 which is located inside the drum transparent 21. Thus, the light beam scans the radiograph 20 in the two dimensional scanning mode. As for the light beam scanning means may be used a CRT or a flying spot scanner.

The light passing through the radiograph is received by a photodetector 23 and converted to an electric signal, which is amplified by an amplifier 24 and converted to a digital signal through an A/D converter 25. The digital signal thus obtained is memorized in a magnetic memory tape 26. The date memorized in the magnetic memory tape 26 is input into arithmetic and logical units or processer 27 like a computer, wherein the Dmax, Do and Dmin of the original image signal are analyzed.

Figure 8:
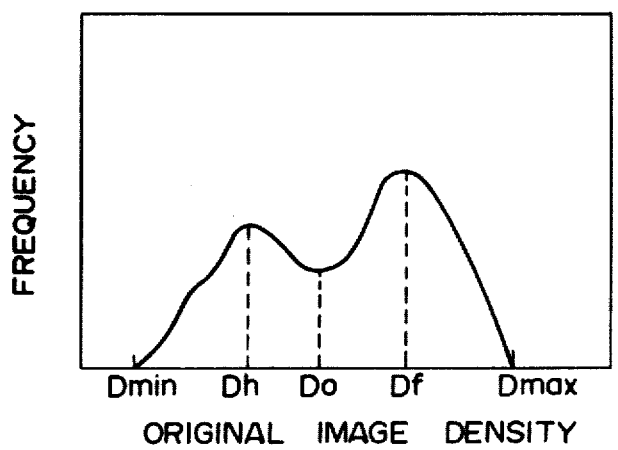

In the normal chest radiograph, a histogram as shown in FIG. 8 can be obtained for the whole chest image. In the histogram shown in FIG. 8, the density for the area outside the object is not included. This histogram has two peaks the lower one thereof representing the frequency distribution for the heart and the higher one thereof representing that of the lungs. The height of the two peaks and the width thereof are different upon the range of the part of the human body for which the histogram was made, the shape of the chest and so on. The minimum and maximum value Dmin and Dmax are calculated as the points where the frequency of the histogram falls to zero or a predetermined small value, e.g. 5% of the maximum frequency. The boundary level Do of the density at the boundary of the heart and the lungs can be determined as the level of the density at the bottom of the valley of the histogram between the two peaks as shown in FIG. 8 or as the average value of the two densities Dh and Df corresponding to the two peaks, i.e. (Dh+Df/2).

When two histograms 28 and 29 are separately made for the heart and lungs as shown in FIG. 9, the boundary level Do can be determined as the average value of the two peaks, i.e. (Dh+Df/2), or as the level of the signal at the crossing point of the two histograms. It will be mentioned hereinafter how to designate the heart and the lungs in the image.

In view of the simplicity of calculation, the above mentioned methods of determining the boundary level Do are advantageous in practice, though there are various other methods possible for determining the boundary level Do. Though it is practically very difficult to obtain the true boundary level Do from the histogram, it has been confirmed that favorable results were obtained even with the above-mentioned approximate value of the boundary level Do.

The designation of the heart and the lungs can be conducted as follows.

The first method is a statistical method in which the boundary level is statistically presumed from a number of radiographs. This method is able to obtain a sufficiently accurate boundary level for practical use by making a proper compensation for the characteristics of the human body to be the object of the radiographic image as desired.

The second method is a direct searching method in which the density observed at the time of scanning the original radiograph is utilized for searching the position of the boundary between the heart and the lungs. In other words, the density of the radiograph is detected to confirm the position of the boundary by making the histogram as shown in FIG. 9. By making the histogram as shown in FIG. 9, it is possible to know the boundary level Do as the level at the crossing point of the two histograms 28 and 29 or to calculate the boundary level Do as the average value of the two peaks of the histograms (Dh+Df/2) as mentioned hereinbefore.

Further, it is also possible to determine the boundary level Do by use of a density signal obtained by scanning the original image as shown in FIGS. 10A to 10C. Referring to FIG. 10A, the central part of the chest radiograph is scanned by a read-out light beam and the density signal waveform obtained thereby along the scanning line is used in combination with a differentiated waveform of the density signal as shown in FIGS. 10B and 10C. Referring to FIGS. 10A to 10C, when the chest radiograph is horizontally scanned at the center thereof, four pulses are obtained as shown in FIG. 10C at the boundaries between the lungs 1 and other portions. The area between the first pulse and the fourth pulse corresponds to the chest itself. Therefore, from the maximum value and the minimum value within this area, Dmax and Dmin can be obtained. The second pulse and the third pulse correspond to the boundaries between the lungs 1 and the heart 2. Therefore, the value of the original image density Do at these points is the boundary level. When the values at these points are different from each other, the average value of these two values can be used as the boundary level Do.

After these values, Dmin, Do and Dmax, have been obtained, the data recorded in the magnetic memory tape 26 are processed to perform the density conversion of gradation processing as shown in FIGS. 2 to 6 so that the radiograph may be reproduced on the final recording medium in the desirable gradation. The processed data are returned to the magnetic memory tape 26 for memorization of the date after processing. The operation of the density can also be performed in the form of analog signals. Further, the signal processing may include the process for compensation for the gradation of the final recording medium such as a photographic film. Furthermore, an unsharp masking process and/or a frequency filtering can be conducted to control the sharpness of the image.

The gradation processed date are read out from the magnetic memory tape 26, converted to an analog signal by a D/A converter 30 and input into a recording light source 32 after amplified by an amplifier 31.

The light emitted from the light source 32 is focused on a copy film 34 by means of a lens 33 to record an image thereon. The copy film 34 is mounted on a recording drum 35 which is rotated and axially moved for causing the copy film mounted thereon to be exposed to the light from the light source 32 in a two dimensional scanning mode so that a radiographic image is recorded on the copy film 34 in the gradation processed form.

As for the copy film 35 can be used a photosensitive material like a silver halide photographic film, diazo film, electrophotographic material and so forth. Further, it is possible to display the image on a monitor like a CRT instead of recording the image on a photosensitive material.

We claim:

1. A method of gradation processing of a chest radiograph in a radiographic image copying system in which a radiograph is scanned with a light beam and the chest radiograph information recorded therein is read out and converted into an electric signal and then a visible image is recorded on a recording medium by use of a scanning recording beam modulated by the electric signal, said method comprising processing the gradation of the image by lowering the level of the electric signal generally in the range of the level corresponding to the density range between the substantial maximum and minimum densities of the image with the level of the electric signal corresponding to the density at the boundary between the lungs and the heart lowered to the most extent in said range.

2. A method of gradation processing of a chest radiograph in a radiographic image copying system as defined in claim 1 wherein said level of the electric signal corresponding to the density of the boundary is lowered by the level of 0.1 to 0.5 in terms of optical density of the finally recording medium.

3. A method of gradation processing of a chest radiograph in a radiographic image copying system as defined in claim 1 wherein the level of the electric signal is continuously lowered in said density range with said level of the boundary lowered to the most extent.

4. An apparatus for performing gradation processing of a chest radiograph in a radiographic image copying system in which a radiograph is scanned with a light beam and the chest radiograph information recorded thereon is read out and converted into an electric signal and then a visible image is recorded on a recording medium by use of a scanning recording beam modulated by the electric signal, said gradation processing apparatus comprising means for determining a signal level corresponding to the boundary between the heart and the lungs of the chest radiation image, means for detecting the substantial maximum and minimum values of said electric signal, and gradation processing means for processing the gradation of the image by lowering the level of the electric signal generally in the range of the level corresponding to the density range between the substantial maximum and minimum densities of the image with the level of the electric signal corresponding to the density at the boundary between the lungs and the heart lowered to the most extent in said range.

5. An apparatus as defined in claim 4 further comprising means for continuously lowering the level of said signal in said density range with said level of the boundary lowered to the most extent.

* * * * *